United States Patent
Hogger et al.

(10) Patent No.: US 11,453,446 B2
(45) Date of Patent: Sep. 27, 2022

(54) FIBER-REINFORCED PLASTICS COMPONENT WITH PLASTICS FOAM STRUCTURE

(71) Applicant: Bayerische Motoren Werke Aktiengesellschaft, Munich (DE)

(72) Inventors: Thomas Hogger, Otterfing (DE); Johannes Staeves, Munich (DE); Joachim Starke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 63 days.

(21) Appl. No.: 16/822,190

(22) Filed: Mar. 18, 2020

(65) Prior Publication Data
US 2020/0216119 A1 Jul. 9, 2020

Related U.S. Application Data

(63) Continuation of application No. PCT/EP2018/081700, filed on Nov. 19, 2018.

(30) Foreign Application Priority Data

Dec. 18, 2017 (DE) .................... 10 2017 222 984.5

(51) Int. Cl.
| | |
|---|---|
| *B62D 29/00* | (2006.01) |
| *B62D 29/04* | (2006.01) |
| *B32B 5/18* | (2006.01) |
| *B32B 5/24* | (2006.01) |
| *B33Y 80/00* | (2015.01) |

(52) U.S. Cl.
CPC .............. *B62D 29/04* (2013.01); *B33Y 80/00* (2014.12); *B62D 29/002* (2013.01)

(58) Field of Classification Search
CPC .... B62D 29/04; B62D 29/002; B62D 29/046; B33Y 80/00; B32B 5/18; B32B 5/24
See application file for complete search history.

(56) References Cited

U.S. PATENT DOCUMENTS

| | | | | |
|---|---|---|---|---|
| 3,871,636 A | * | 3/1975 | Boyle .................... | B60K 37/00 267/140 |
| 5,080,950 A | * | 1/1992 | Burke ...................... | B32B 5/24 428/157 |

(Continued)

FOREIGN PATENT DOCUMENTS

| | | |
|---|---|---|
| CN | 103068545 A | 4/2013 |
| CN | 103261006 A | 8/2013 |

(Continued)

OTHER PUBLICATIONS

International Search Report (PCT/ISA/210) issued in PCT Application No. PCT/EP2018/081700 dated Feb. 13, 2019 with English translation (five (5) pages).

(Continued)

*Primary Examiner* — Joanna Pleszczynska
(74) *Attorney, Agent, or Firm* — Crowell & Moring LLP

(57) ABSTRACT

A fiber-reinforced plastics component includes a component plastics body, which defines at least parts of a plastics component, and at least one fiber-reinforced rod. The component plastics body is formed at least partially from plastics foam and at least partially surrounds the at least one fiber-reinforced rod in positively locking fashion.

6 Claims, 1 Drawing Sheet

(56) References Cited

U.S. PATENT DOCUMENTS

| | | | | |
|---|---|---|---|---|
| 2008/0260992 | A1* | 10/2008 | Take | B32B 3/12 |
| | | | | 428/117 |
| 2009/0123687 | A1* | 5/2009 | Chakraborty | E04C 2/365 |
| | | | | 428/76 |
| 2010/0266833 | A1* | 10/2010 | Day | B29C 70/865 |
| | | | | 428/304.4 |
| 2013/0133771 | A1 | 5/2013 | Richardson et al. | |
| 2013/0273341 | A1* | 10/2013 | Albertelli | F41H 5/0478 |
| | | | | 428/218 |
| 2019/0106159 | A1 | 4/2019 | Hogger | |

FOREIGN PATENT DOCUMENTS

| | | |
|---|---|---|
| CN | 106573435 A | 4/2017 |
| DE | 10 2010 014 503 A1 | 10/2011 |
| DE | 10 2012 218 686 A1 | 4/2014 |
| DE | 10 2014 104 278 A1 | 10/2015 |
| DE | 10 2016 210 095 A1 | 12/2017 |
| EP | 3 187 330 A1 | 7/2017 |
| WO | WO 01/68394 A2 | 9/2001 |
| WO | WO 2011/072739 A1 | 6/2011 |
| WO | WO 2014/189946 A1 | 11/2014 |

OTHER PUBLICATIONS

German-language Written Opinion (PCT/ISA/237) issued in PCT Application No. PCT/EP2018/081700 dated Feb. 13, 2019 (five (5) pages).

German-language Search Report issued in German Application No. 102017222984.5 dated Aug. 1, 2018 with partial English translation (11 pages).

English-language Chinese Office Action issued in Chinese application No. 201880061843.9 dated Dec. 31, 2021 (Nine (9) pages).

\* cited by examiner

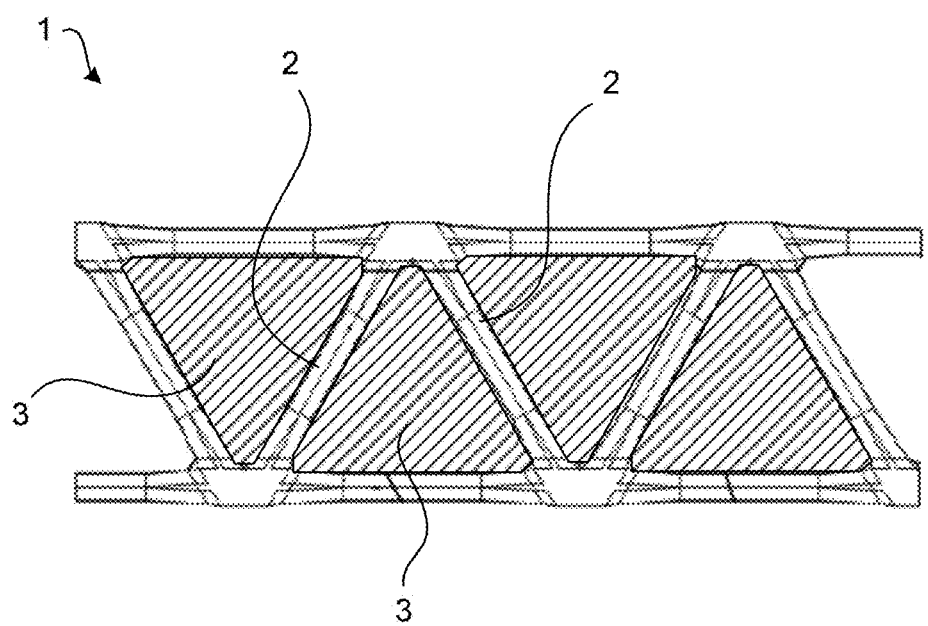

FIBER-REINFORCED PLASTICS COMPONENT WITH PLASTICS FOAM STRUCTURE

CROSS REFERENCE TO RELATED APPLICATIONS

This application is a continuation of PCT International Application No. PCT/EP2018/081700, filed Nov. 19, 2018, which claims priority under 35 U.S.C. § 119 from German Patent Application No. 10 2017 222 984.5, filed Dec. 18, 2017, the entire disclosures of which are herein expressly incorporated by reference.

BACKGROUND AND SUMMARY OF THE INVENTION

The invention relates to a fiber-reinforced plastic component having a plastic foam structure that forms a three-dimensional plastic component body. The fiber-reinforced plastic component serves primarily for use in motor vehicles, in which noise is to be minimized and excellent performance in the event of a crash is desired.

Fiber-reinforced plastic components have been used for many years in various fields of industry, including intensively in automobile construction. They have high potential for lightweight construction and, compared to other materials, for example metals or unreinforced plastics, can absorb high tensile forces through the incorporated fibers. At the same time, the weight-specific advantages of fiber-reinforced plastics are best utilizable when the fibers in the matrix material are designed to conform to the load pathway, which requires stress-optimized construction of the material.

Reinforcing fiber rods are used in the technology of fiber composite components and differ from fiber layers or fiber weaves in that they are formed by a multitude of continuous fibers in one direction, i.e. are brought into a predetermined rod shape by the fibers. Cross-sectional rod shapes used here are usually round, tetragonal or hexagonal rods having a height/width ratio of not less than $\frac{1}{10}$; more particularly, the fiber rods have a dimension in a non-round cross section of at least 3 mm×3 mm. Smaller height/width ratios are features not of a formed fiber rod, but of types of laid scrim.

For the use of fiber rods, use in a skeletal design with subsequent processing by injection molding for component manufacture was also found to be advantageous, but the capital costs for the tools for production of such components are comparatively high. Moreover, plastics become brittle and give crash characteristics of limited favorability. With regard to acoustics as well, conventional fiber composite components are in need of improvement.

It is therefore an object of the invention to provide a fiber-reinforced plastic component that has improved crash characteristics and improved acoustics coupled with lower tool costs.

This object is achieved by the fiber-reinforced plastic component according to the claimed invention.

The invention provides a fiber-reinforced plastic component comprising a plastic component body which defines at least parts of a plastic component. The plastic component comprises at least one fiber-reinforced rod, especially in an embedded arrangement in the plastic component body. The plastic component body is formed at least partly from plastic foam and at least partly form-fittingly surrounds the at least one fiber-reinforced rod, meaning that the at least one reinforcing fiber rod has been subjected to direct in-mold coating at least in sections with the expanded plastic foam.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic illustration of an exemplary plastic component body having a fiber-reinforced rod and plastic foam.

DETAILED DESCRIPTION OF THE DRAWING

FIG. 1 discloses a plastic component body 1 that defines at least part of a plastic component. The plastic component includes at least one fiber-reinforced rod 2, especially in an embedded arrangement in the plastic component body 1. The plastic component body 1 is formed at least partly from plastic foam 3 and at least partly form-fittingly surrounds the at least one fiber-reinforced rod 2.

Plastic foam in the present context includes any foam-like plastic structure, including polyurethane foam, thermoplastic foam (TSG), thermoset foam (for example of epoxy resin), porous fixed nonwoven materials, etc.

The plastic foam has a lower density and therefore a lower weight compared to solid plastic materials. In the event of a crash, the plastic component body can be deformed without splintering. By means of the at least one reinforcing fiber rod, however, it is possible to generate sufficiently high stiffness for use. The plastic foam additionally absorbs noise and hence promotes improved acoustics.

In one embodiment, the foam structure of the plastic foam may be formed by honeycombs. In addition, in an advantageous variant, the plastic foam itself is envisaged as forming a honeycomb structure, especially a folded honeycomb structure that assures favorable force absorption.

In addition, in one alternative of the fiber-reinforced plastic component, it is envisaged as having at least one metallic reinforcing element and/or at least one plastic reinforcing element in the form of a force introduction element of the plastic component. Such reinforcing elements may be formed, for example, by plates. Force introduction elements used include bushes, for example. In addition, the fiber-reinforced plastic component may have two-dimensional reinforcing elements made of fiber-reinforced plastic.

In an advantageous variant embodiment of the fiber-reinforced plastic component, the plastic foam is formed by expanded polypropylene (EPP) or extruded thermoplastic foam (XPP) or thermoplastic foam (slabstock foam) or expanded polystyrene (EPS). Reinforcing rods employed especially include carbon fiber rods with a plastic matrix, especially a polypropylene matrix. By using the same material in the foam and the matrix, good cohesion can be achieved. The plastic component body forms at least part of the final form of the fiber-reinforced plastic component to be manufactured.

A development of the fiber-reinforced plastic component is additionally characterized in that it has an outer lamination, for example a decoration or a textile, on at least one outer face or has been coated with a high-gloss surface, for example a PU lacquer or a film.

One working example of the fiber-reinforced plastic component is characterized in that the plastic foam fully surrounds the at least one reinforcing fiber rod in circumferential direction and along its axial extent.

In an advantageous embodiment, the fiber-reinforced plastic component has a multitude of reinforcing fiber rods that have each been subjected to partial in-mold coating by the foam of the plastic component body or fully surrounded by plastic foam. The plastic component body composed of plastic foam may thus have been formed either solely between the reinforcing fiber rods or so as to completely enclose them.

In an embodiment which is advantageous with regard to the introduction of force and distribution of force within the fiber-reinforced plastic component, the multitude of reinforcing fiber rods are mutually arranged in a lattice structure. The lattice structure may be in two-dimensional form within a plane or in three-dimensional form as a spatial structure, in which case the reinforcing fiber rods each collectively generate corresponding lattice nodes at their connection points. This promotes arrangement or alignment of the reinforcing fiber rods so as to conform to the load pathway.

In a further development of the fiber-reinforced plastic component, the plastic component body additionally has an injection-molded structure composed of plastic, by means of which the multitude of reinforcing fiber rods is bonded. The injection-molded structure here may generate a carrier structure on which the reinforcing fiber rods are secured. In addition, the injection-molded structure may have a lattice structure corresponding to that of reinforcing fiber rods, such that the reinforcing fiber rods and the injection-molded structure are formed so as to at least partly overlap. Also advantageous is a variant embodiment in which the injection-molded structure has binding structures in the form of force introduction elements and hence in the form of force introduction points. Binding structures used in the injection-molded structure include mounts, bushes, loops, threads or threaded holes, undercuts and the like. Using the binding structures, the fiber-reinforced plastic component can be secured, for example, to the vehicle frame. By virtue of the reinforcing fiber rods being bonded to the injection-molded structure, the force is introduced via the binding structures into the injection-molded structure and hence into the reinforcing fiber rods.

A further favorable embodiment envisaged is that in which the injection-molded structure has been subjected to at least partial, but preferably complete, in-mold coating with the plastic foam of the plastic component body.

It is possible to produce such a fiber-reinforced plastic component, for example, by first applying the injection-molded structure to the reinforcing fiber rods and then foaming the plastic component body in a spatially predetermined manner on or around the reinforcing fiber rods, followed by curing. The plastic foam is preferably formed by a three-dimensional structure, especially in an additive manufacturing method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fiber-reinforced plastic component of a motor vehicle, comprising:
   a plastic component body; and
   at least one fiber-reinforced rod, wherein
   the plastic component body is formed at least partly from plastic foam and at least partly form-fittingly surrounds the at least one fiber-reinforced rod,
   the at least one fiber-reinforced rod includes a carbon fiber rod with a plastic matrix,
   the plastic foam and the plastic matrix are composed of a same material, the at least one fiber-reinforced rod has been subjected to in-mold coating by the plastic foam,
   the plastic foam has a noise absorption functionality,
   multiple fiber-reinforced rods are mutually arranged in a lattice structure,
   the plastic component body additionally includes an injection-molded structure, wherein the injection-molded structure is subjected to in-mold coating by the plastic foam, wherein the injection-molded structure has a lattice structure that corresponds to the lattice structure of the multiple fiber-reinforced rods such that the injection-molded structure and the multiple fiber-reinforced rods overlap, wherein the injection-molded structure is a carrier structure applied to the multiple fiber-reinforced rods, and wherein the multiple fiber-reinforced rods are secured on the carrier structure of the injection-molded structure, and
   the injection-molded structure includes binding structures, wherein the binding structures secure the fiber-reinforced plastic component to a vehicle frame of the motor vehicle.

2. The fiber-reinforced plastic component according to claim 1, further comprising:
   at least one metallic reinforcing element and/or at least one plastic reinforcing element.

3. The fiber-reinforced plastic component according to claim 1, wherein
   the plastic foam forms a honeycomb structure.

4. The fiber-reinforced plastic component according to claim 3, wherein
   the honeycomb structure is a pleated honeycomb structure.

5. The fiber-reinforced plastic component according to claim 1, wherein
   the plastic component has two-dimensional reinforcing elements made of fiber-reinforced plastic.

6. The fiber-reinforced plastic component according to claim 1, wherein
   the plastic component has an outer lamination on at least one outer face.

* * * * *